US012649348B2

(12) United States Patent
Todd et al.

(10) Patent No.: US 12,649,348 B2
(45) Date of Patent: Jun. 9, 2026

(54) LATERAL RETENTION FEATURE FOR VEHICLE STABILIZER BAR

(71) Applicant: Polaris Industries Inc., Medina, MN (US)

(72) Inventors: Mason M. Todd, Wyoming, MN (US); Parry G. Ragland, Wyoming, MN (US); Mitchell S. Kemppainen, Midvale, UT (US); Gene A. Huber, Jr., Winamac, IN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 19/085,092

(22) Filed: Mar. 20, 2025

(65) Prior Publication Data

US 2025/0296397 A1 Sep. 25, 2025

Related U.S. Application Data

(60) Provisional application No. 63/568,478, filed on Mar. 22, 2024.

(51) Int. Cl.
B60G 21/055 (2006.01)

(52) U.S. Cl.
CPC .. B60G 21/0551 (2013.01); *B60G 2204/1222* (2013.01)

(58) Field of Classification Search
CPC ...................... B60G 2204/1222; B60G 21/055
See application file for complete search history.

(56) References Cited

U.S. PATENT DOCUMENTS

| | | | | |
|---|---|---|---|---|
| 7,128,328 | B2 * | 10/2006 | Torongo ................. | F16B 4/004 |
| | | | | 411/521 |
| 11,318,806 | B2 * | 5/2022 | Verbowski ............... | B62D 7/22 |
| 2006/0181046 | A1 * | 8/2006 | Cai ....................... | F16F 1/3835 |
| | | | | 267/273 |
| 2007/0170681 | A1 * | 7/2007 | Nelson ............... | B60G 21/0555 |
| | | | | 267/277 |
| 2008/0036166 | A1 * | 2/2008 | Russell .............. | B60G 21/0551 |
| | | | | 267/276 |
| 2008/0093817 | A1 * | 4/2008 | Russell .............. | B60G 21/0551 |
| | | | | 267/273 |

FOREIGN PATENT DOCUMENTS

| | | | | | |
|---|---|---|---|---|---|
| EP | 1254793 | A2 * | 11/2002 | ............ | F16F 1/3814 |
| EP | 1522433 | A1 * | 4/2005 | ......... | B60G 21/0551 |
| EP | 1555145 | A1 * | 7/2005 | ......... | B60G 21/0551 |
| JP | 2012162170 | A * | 8/2012 | | |
| WO | WO-2009104815 | A1 * | 8/2009 | ............... | F16F 1/16 |
| WO | WO-2016067751 | A1 * | 5/2016 | ............ | B29C 66/71 |

\* cited by examiner

*Primary Examiner* — Nicole T Verley
(74) *Attorney, Agent, or Firm* — Merchant & Gould P.C.

(57) ABSTRACT

A stabilizer bar assembly for a vehicle is provided. In examples, the stabilizer bar assembly includes a stabilizer bar having a first end configured to couple to a right side of a suspension system of the vehicle and a second end configured to couple to a left side of the suspension system. The stabilizer bar assembly further includes at least one lateral retention feature, having a wire coiled around the stabilizer bar to retain the wire at a location between the first end and the second end of the stabilizer bar, thereby restricting lateral movement of the stabilizer bar when the lateral retention feature interfaces with a bracket coupling the stabilizer bar to a chassis of the vehicle.

13 Claims, 10 Drawing Sheets

600

602 — Obtain Stabilizer Bar

604 — Identify Location for Lateral Retention Feature

606 — Form Lateral Retention Feature Around Stabilizer Bar at Identified Location 608 — Additional Retention Feature?    Yes No 610 — Provide Completed Stabilizer Bar Assembly

LATERAL RETENTION FEATURE FOR VEHICLE STABILIZER BAR

CROSS-REFERENCE TO RELATED APPLICATION

The present application claims priority to U.S. Provisional Application Ser. No. 63/568,478, titled "Lateral Retention Feature for Vehicle Stabilizer Bar," filed Mar. 22, 2024, the entire disclosure of which is hereby incorporated by reference in its entirety.

BACKGROUND

In examples, a stabilizer bar links the right and left side of a vehicle to improve rigidity and reduce the roll of the vehicle when cornering. However, a retention mechanism for such a stabilizer bar may affect its longevity, require vehicle-specific engineering considerations, and/or may not be adaptable to other bars having different geometry (e.g., varying diameters and/or shapes), among other examples.

It is with respect to these and other general considerations that embodiments have been described. Also, although relatively specific problems have been discussed, it should be understood that the embodiments should not be limited to solving the specific problems identified in the background.

SUMMARY

In one aspect, a stabilizer bar assembly for a vehicle is provided. The stabilizer bar assembly comprises: a stabilizer bar comprising: a first end configured to couple to a right side of a suspension system of the vehicle; and a second end configured to couple to a left side of the suspension system; and a lateral retention feature, comprising a wire coiled around the stabilizer bar to retain the wire at a location between the first end and the second end of the stabilizer bar.

In another aspect, a vehicle is provided. The vehicle comprises: a plurality of ground-engaging members; a suspension system supported by the plurality of ground-engaging members, wherein the suspension system includes a right side and a left side; a stabilizer bar having a first end coupled to the right side of the suspension system and a second end coupled to the left side of the suspension system, wherein: the stabilizer bar is coupled to a chassis of the vehicle by a mounting bracket; and the stabilizer bar comprises a lateral retention feature configured to interface with the mounting bracket, thereby restricting lateral movement of the stabilizer bar, the lateral retention feature comprising a wire coiled around the stabilizer bar to retain the wire at a location between the first end and the second end of the stabilizer bar.

In a further aspect, a method of manufacturing a stabilizer bar assembly is provided. The method comprises: obtaining a stabilizer bar for a vehicle; identifying a first location at which the stabilizer bar is to be retained by a first mounting bracket of the vehicle; forming, adjacent to the first location, a first coiled lateral retention feature; identifying a second location at which the stabilizer bar is to be retained by a second mounting bracket of the vehicle; and forming, adjacent to the second location, a second coiled lateral retention feature.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
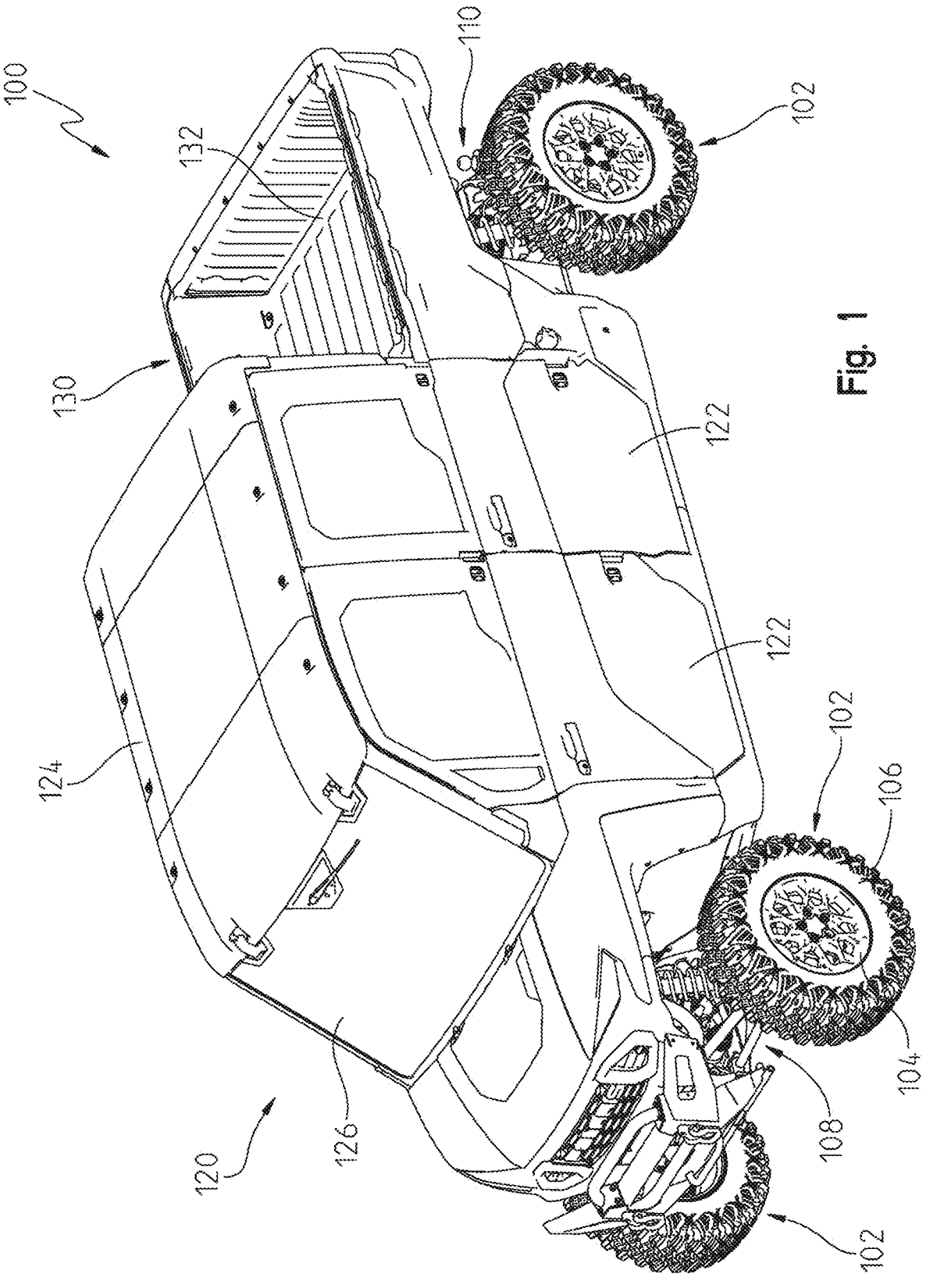
FIG. 1 illustrates a perspective view of an example vehicle.
Figure 2:
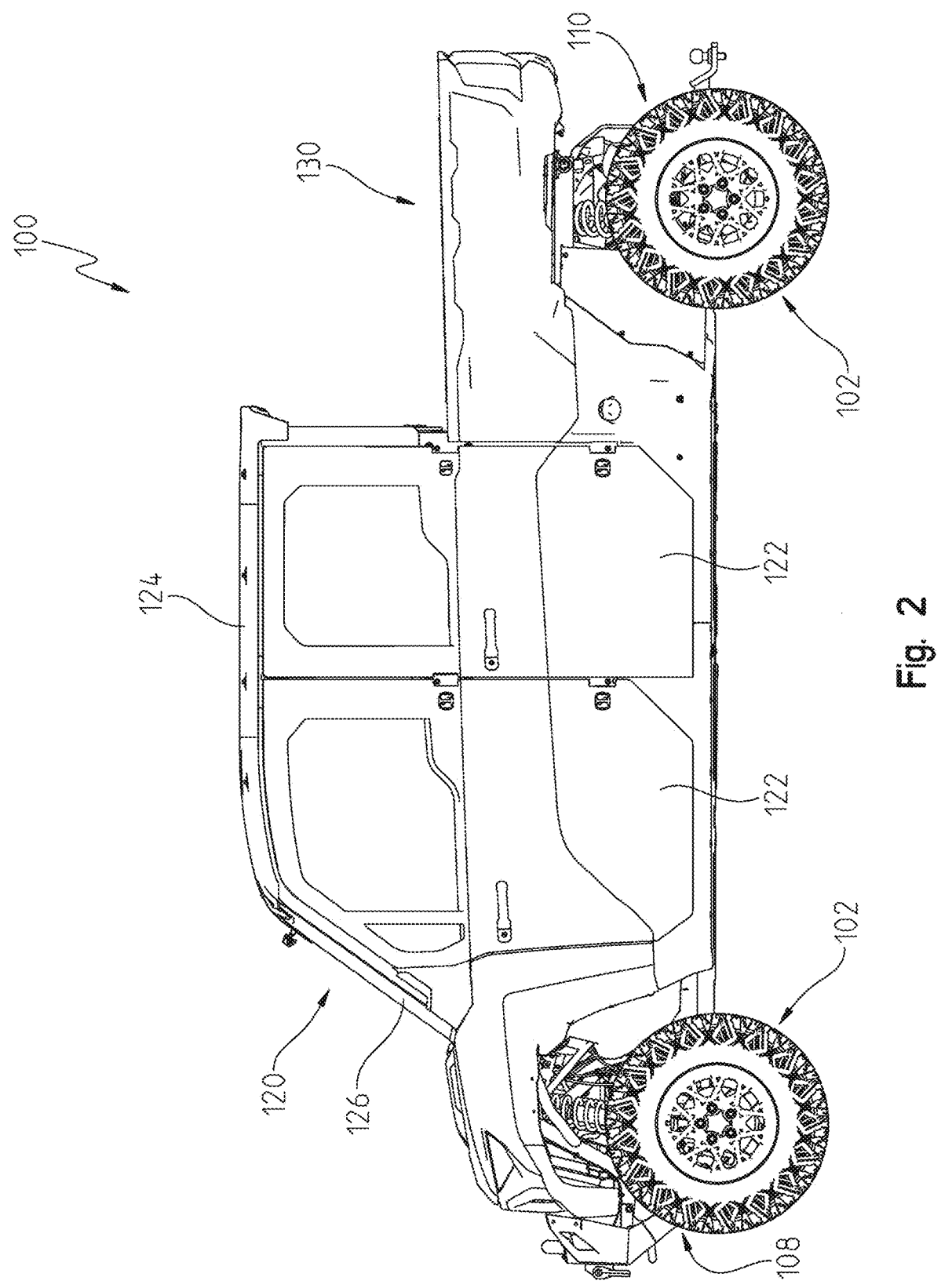
FIG. 2 illustrates a left side view of the example vehicle of FIG. 1.
Figure 3:
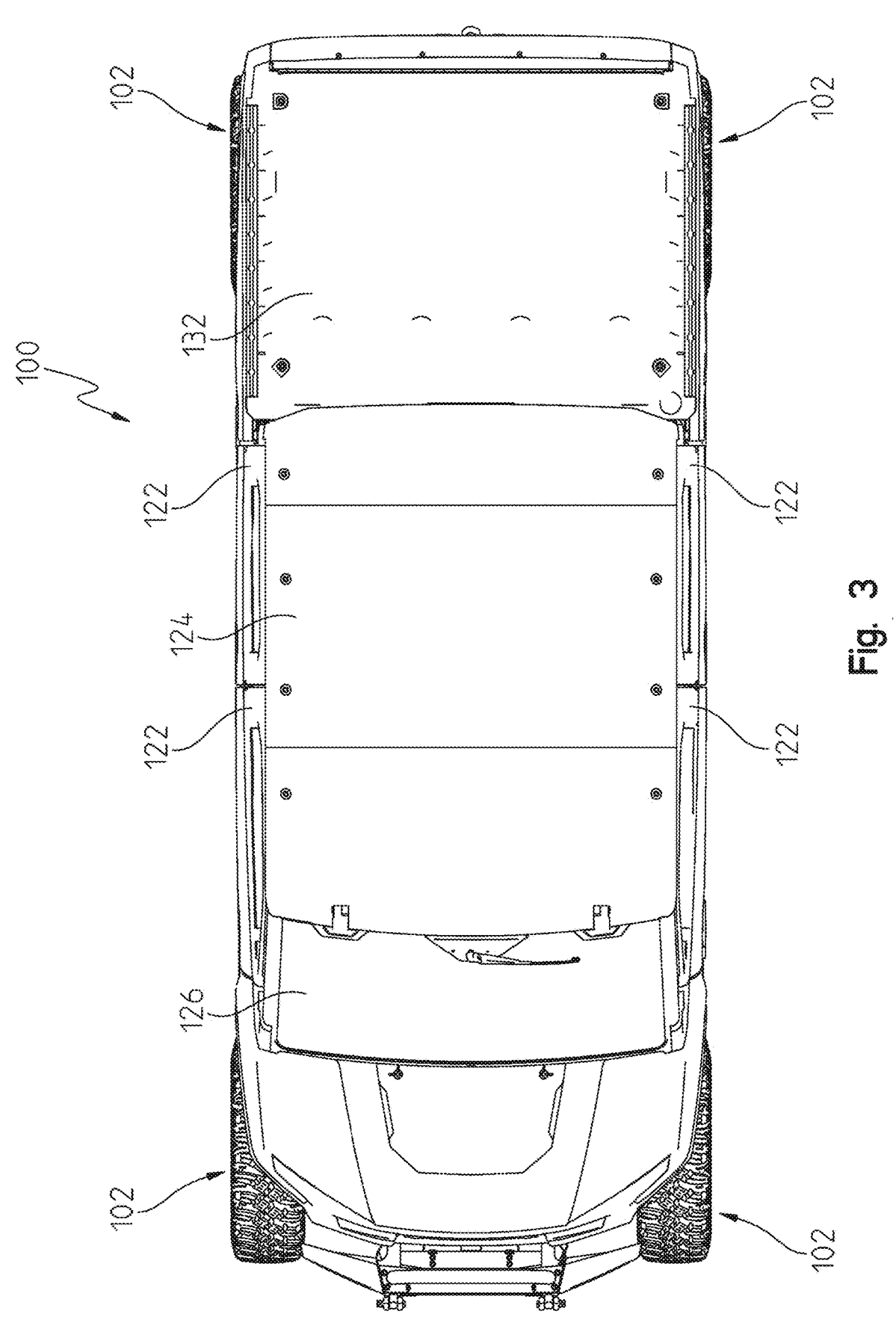
FIG. 3 illustrates a top view of the example vehicle of FIG. 1.

Various embodiments of the present disclosure will be described in detail with reference to the drawings, wherein like reference numerals represent like parts and assemblies throughout the several views. Reference to various embodiments does not limit the scope of the disclosure, which is limited only by the scope of the claims attached hereto. Additionally, any examples set forth in this specification are not intended to be limiting and merely set forth some of the many possible embodiments for the claimed invention.

In examples, a stabilizer bar links the left side and the right side of the suspension system of a vehicle, thereby improving rigidity of the vehicle and reducing roll. Additionally, the stabilizer bar may be retained at intermediate positions along the bar to reduce movement of the stabilizer bar during vehicle operation that could otherwise cause the stabilizer bar to interact with other components of the suspension system or other vehicle systems. However, such retention features may traditionally be fused (e.g., welded) to the stabilizer bar, which may negatively affect structural properties of the bar. For example, the stabilizer bar may be weakened or made more brittle at such weld joints, thereby affecting longevity and potentially promoting an increased likelihood of structural failure.

Accordingly, aspects of the present disclosure relate to a lateral retention feature for a vehicle stabilizer bar that need not be fused to the stabilizer bar. An example lateral retention feature according to aspects described herein comprises a wire coiled around the stabilizer bar, such that friction between the wire and the stabilizer bar restricts lateral movement of the stabilizer bar (e.g., as the retention feature interfaces with a corresponding mounting member, such as mounting brackets 206A and/or 206B in FIGS. 5 and 6). Another example lateral retention feature according to aspects described herein is crimped onto the stabilizer bar, such that it is similarly retained by friction between the feature and the bar.

Thus, the disclosed aspects are instead retained, at least in part, by friction between the retention feature and the stabilizer bar, thereby having a reduced effect on the structural properties of the stabilizer bar. Additionally, such a retention feature may have improved reusability across different stabilizer bar designs (e.g., having different profiles/thicknesses) and/or may improve the ability to iterate on prototype designs, for example when calibrating the stiffness and/or performance of a stabilizer bar and/or corresponding suspension system design.

With reference to FIGS. 1-5, an illustrative embodiment of a vehicle 100 is shown. In examples, vehicle 100 may be a utility terrain vehicle ("UTV"), an all-terrain vehicle ("ATV"), or a side-by-side vehicle ("SxS"), among other examples. Vehicle 100 as illustrated includes a plurality of ground engaging members 102. Illustratively, ground engaging members 102 are wheels 104 and associated tires 106. Other example ground engaging members include skis and tracks. In one embodiment, one or more of the wheels may be replaced with tracks, such as the Prospector II Tracks available from Polaris Industries Inc., located at 2100 Highway 55 in Medina, MN 55340 or non-pneumatic tires, such as those shown in U.S. Pat. No. 8, 176,957 and U.S. Pat. No. 8,104,524, the complete disclosures of which are expressly incorporated herein by reference.

Referring to the illustrated embodiment in FIG. 1, a first set of wheels, one on each side of vehicle 100, generally correspond to a front axle 108. A second set of wheels, one on each side of vehicle 100, generally correspond to a rear axle 110. Although each of front axle 108 and rear axle 110 are shown having a single ground engaging members 102 on each side, multiple ground engaging members 102 may be included on each side of the respective front axle 108 and rear axle 110. As configured in FIG. 1, vehicle 100 is a four-wheel, two-axle vehicle. In one embodiment, one or more modular subsections (not pictured) may be added to vehicle 100 to transform vehicle 100 into a three-axle vehicle, a four-axle vehicle, and so on.

Vehicle 100 includes an operator area 120, which includes seating for one or more passengers. As illustrated, operator area 120 includes a front seating area (e.g., for an operator or driver and a passenger) and a rear seating area for accommodating at least one rear seat (e.g., a left rear seat and/or a right rear seat). Further, operator area 120 is enclosed with a plurality of doors 122, a roof 124, and a windshield 126. However, in other embodiments, operator area 120 may not be enclosed and instead is an open-air operator area. In further embodiments, the enclosure surrounding operator area 120 may be removable, such that operator area 120 may be enclosed and/or open dependent on an operator's preference. While vehicle 100 is illustrated as including two rows of seating, it will be appreciated that, in other examples, any number of rows of seating (e.g., a second row of seating and, in some examples, a third row of seating) may be provided.

In examples, operator area 120 further includes a plurality of operator controls by which an operator may provide input into the control of vehicle 100. Example controls include a steering wheel, which is rotated by the operator to change the orientation of one or more of ground engaging members 102, such as the wheels associated with front axle 108, to steer vehicle 100. In one embodiment, the steering wheel changes the orientation of the wheels of front axle 108 and rear axle 110 to provide four-wheel steering.

In examples, one or more of ground engaging members 102 are operatively coupled to a power source to power the movement of vehicle 100. Example power sources include combustion engines and electric motors. Accordingly, the controls may include a first foot pedal actuatable by the vehicle operator to control the acceleration and speed of vehicle 100 through the control of the power source and a second foot pedal actuatable by the operator to decelerate vehicle 100 through a braking system.

As another example, the controls of vehicle 100 further include a gear shift input control, which is operatively coupled to a shiftable transmission, to communicate whether the shiftable transmission is in a low forward gear, a high forward gear, a reverse gear, neutral, and if included a park position. Additionally, or alternatively, the controls further include a parking brake input control, which is operatively coupled to a parking brake of vehicle 100.

Vehicle 100 is further illustrated as comprising a bed 130 having a cargo-carrying surface 132. Cargo-carrying surface 132 may be flat, contoured, and/or comprised of several sections. Additional discussion of aspects related to vehicle 100 are disclosed in U.S. Pat. No. 7,950,486, the disclosure of which is expressly incorporated by reference herein. Further, it will be appreciated that vehicle 100 is provided for illustrative purposes and, in other examples, aspects described herein may similarly be applicable to any of a variety of other vehicles, including, but not limited to, an off-road vehicle, a two-or three-wheeled motorcycle, a snowmobile, or a personal transport vehicle.

Figures 4, 5, 6:
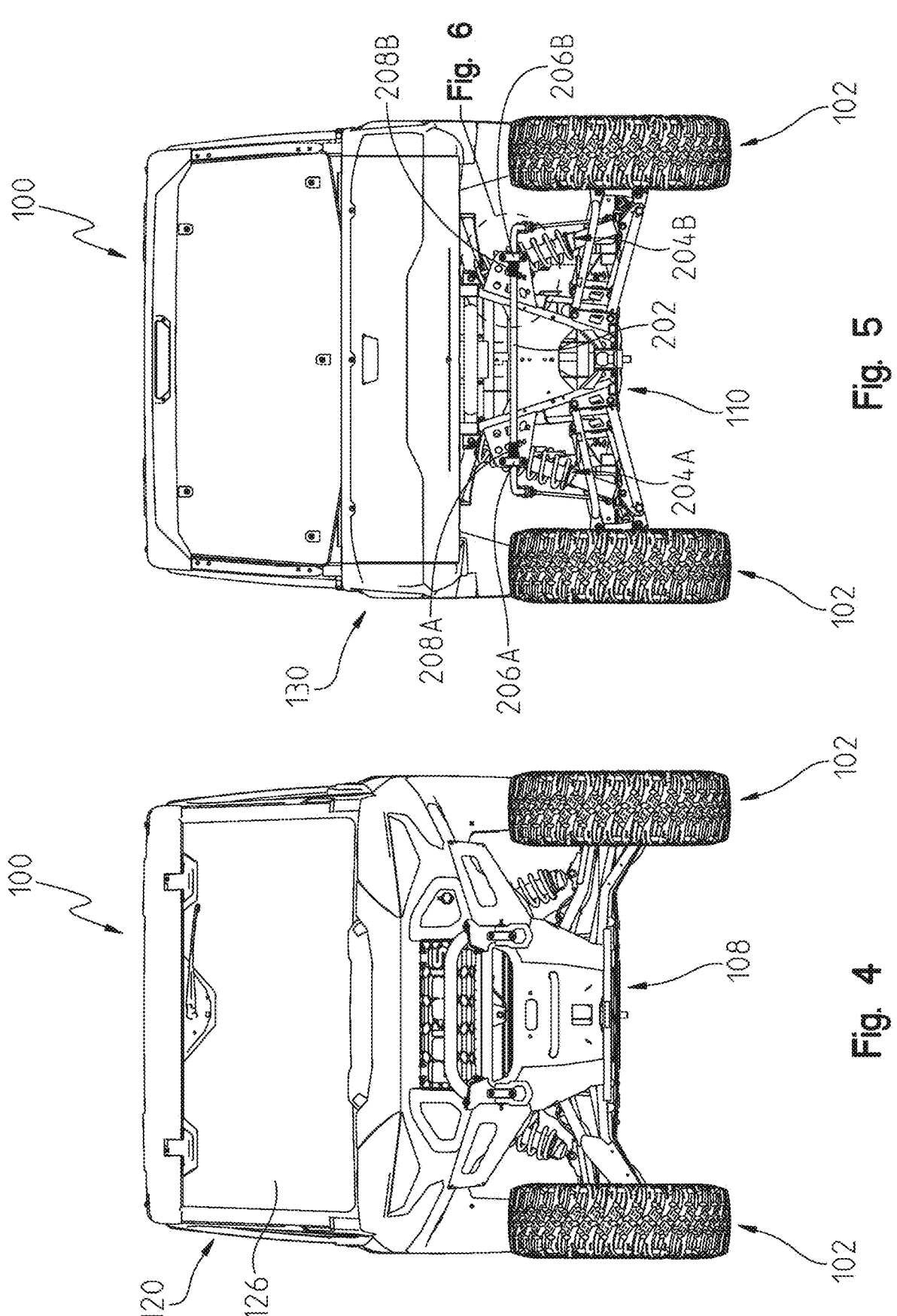
FIG. 4 illustrates a front view of the example vehicle of FIG. 1.
FIG. 5 illustrates a rear view of the example vehicle of FIG. 1, further depicting an example lateral retention feature according to aspects described herein.
FIG. 6 illustrates detail view of the example lateral retention feature of FIG. 5.
Figure 6:
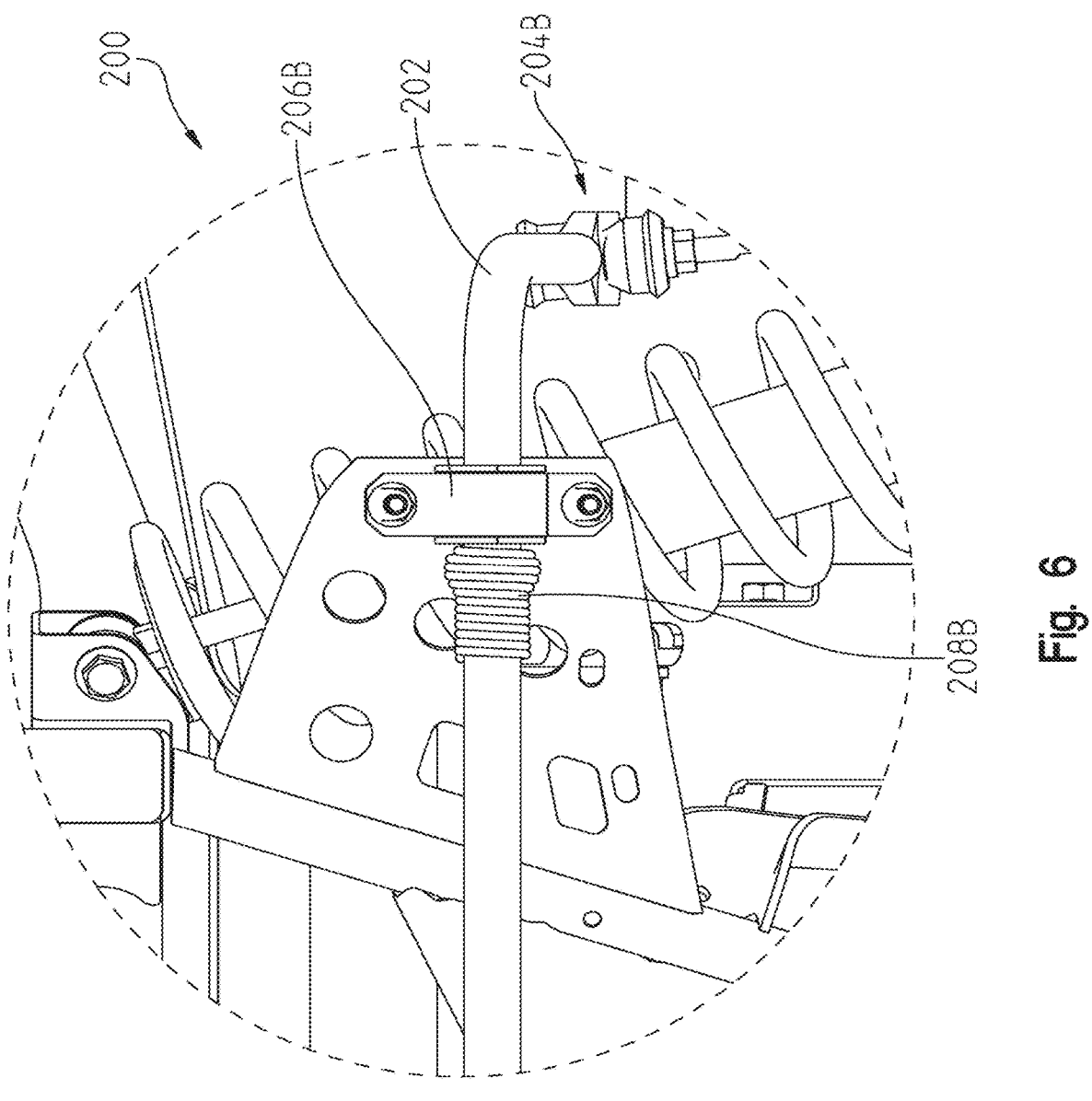

With reference now to FIGS. 5 and 6, stabilizer bar 202 joins left side 204A and right side 204B of a suspension system of vehicle 100. Lateral movement of stabilizer bar 202 is restricted by lateral retention features 208A and 208B, which interface with mounting brackets 206A and 206B, respectively. In examples, mounting brackets 206A and 206B each comprise a bushing through which stabilizer bar 202 is disposed, thereby avoiding metal-to-metal contact between stabilizer bar 202 and brackets 206A and 206B. While the present example depicts a rear stabilizer bar, it will be appreciated that similar aspects may be used for a front stabilizer bar, among other examples.

As illustrated, lateral retention features 208A and 208B each comprise wire coiled around stabilizer bar 202. Lateral retention feature 208A is laterally inward from bracket 206A (e.g., closer to a centerline of vehicle 100), and lateral retention feature 208B is similarly laterally inward of bracket 206B. Thus, the depicted configuration may be referred to as an "inboard" configuration. It will be appreciated that, in other examples, an "outboard" configuration may be used, where lateral retention features 208A and 208B are each laterally external from brackets 206A and 206B, respectively.

Further, while the instant example depicts two lateral retention features 208A and 208B, and two brackets 206A and 206B, it will be appreciated that any number of such elements may be used in other examples. For instance, a single bracket may be used in combination with two lateral retention features (e.g., one on each side of the bracket) or multiple brackets may each have multiple associated lateral retention features, among other examples.

Additionally, while examples are described herein with respect to a number of brackets that each interface with one or more corresponding lateral retention features, it will be appreciated that any of a variety of other mechanisms may be used to mechanically couple stabilizer bar 202 to a frame of vehicle 100 and/or which interface with one or more lateral retention features to restrict lateral movement of stabilizer bar 202 according to aspects of the present disclosure.

Figure 7:
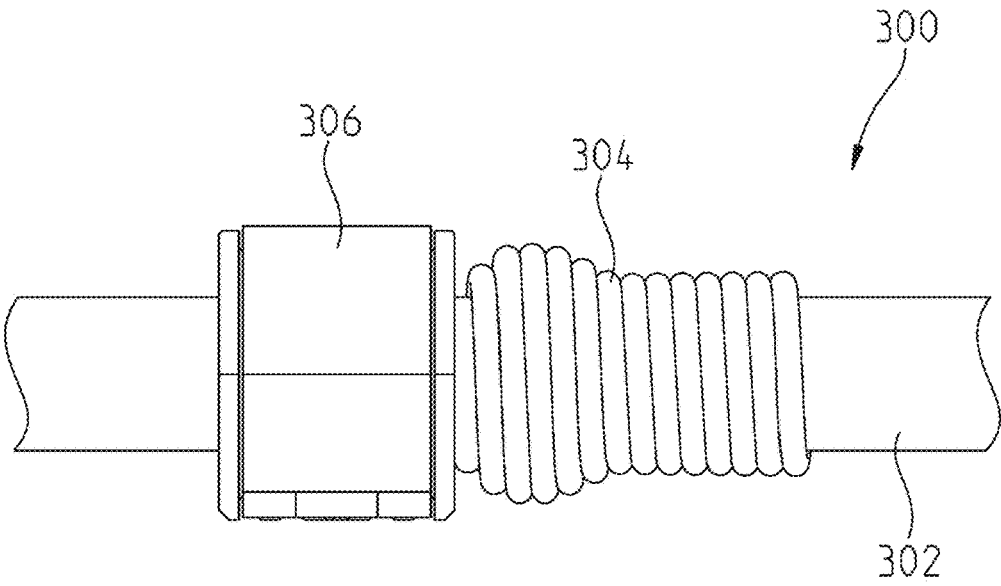
FIG. 7 illustrates a side view of an example lateral retention feature according to aspects described herein.
Figure 8:
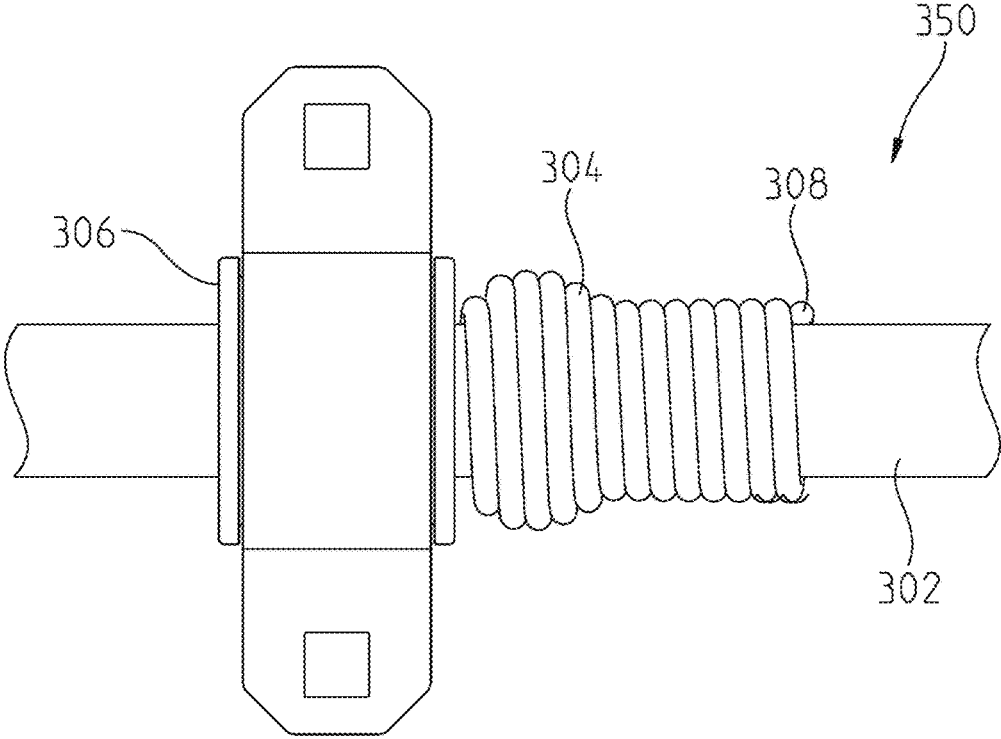
FIG. 8 illustrates a top view of the example lateral retention feature of FIG. 7.

FIGS. 7 and 8 illustrate side view 300 and top view 350, respectively, of an example lateral retention feature 304 according to aspects described herein. As illustrated, lateral retention feature 304 is formed on stabilizer bar 302 and is configured to interface with bracket 306 to restrict lateral movement of stabilizer bar 302 accordingly. Aspects of stabilizer bar 302, lateral retention feature 304, and bracket 306 may be similar to those discussed above with respect to stabilizer bar 202, lateral retention features 208A and 208B, and brackets 206A and 206B, respectively, and are therefore not redescribed in detail below.

As illustrated, lateral retention feature 304 is coiled around bar 302 to have a profile that is initially close in diameter to bar 302 at end 308, after which it increases in diameter and then decreases in diameter (e.g., with proximity to bracket 306). This coil profile may reduce or avoid the degree to which lateral retention feature 304 interacts with bracket 306 (and/or a bushing disposed therein). In examples, such a coil profile may facilitate easier manufacture of a stabilizer bar assembly that includes lateral retention feature 304, for example providing increased clearance (e.g., between stabilizer bar 302 and the wire of lateral retention feature 304) for terminating the wire after it has been wound onto stabilizer bar 302 (e.g., starting from end 308). Additionally, or alternatively, such a coil profile may permit an end of the wire to be tucked underneath one or more coils of the lateral retention feature, thereby preventing or reducing interaction between the end of the wire and the stabilizer/bushing (which would otherwise potentially result in increased wear).

It will be appreciated that, in other examples, any of a variety of other coil profiles may be used. For example, while the depicted example includes a single layer of wire, multiple layers may be used for at least a portion of the lateral retention feature in other examples. Additionally, or alternatively, the wire is coiled to form a space or gap between one or more coils of the lateral retention feature. As another example, the lateral retention feature may have a substantially consistent diameter. In examples, the number of coils that lateral retention feature 304 has around bar 302 is tuned according to a desired retention force, such that additional coils may be added in instances where greater retention force is desirable.

Additionally, the present example includes a wire that is substantially round in profile, but a square, rectangular, or triangular wire profile may be used in other examples. For instance, a triangular wire profile may cause lateral retention feature 304 to have more grip to bar 302. It will be appreciated that, in some instances, multiple wire profiles may be used (e.g., along a continuous segment of wire or as multiple wire segments). In examples, lateral retention feature 304 is made of mild steel, spring steel, or hardened steel, but it will be appreciated that any of a variety of other materials may be used in other examples. Any of a variety of wire gauges may be used.

Figure 9A:
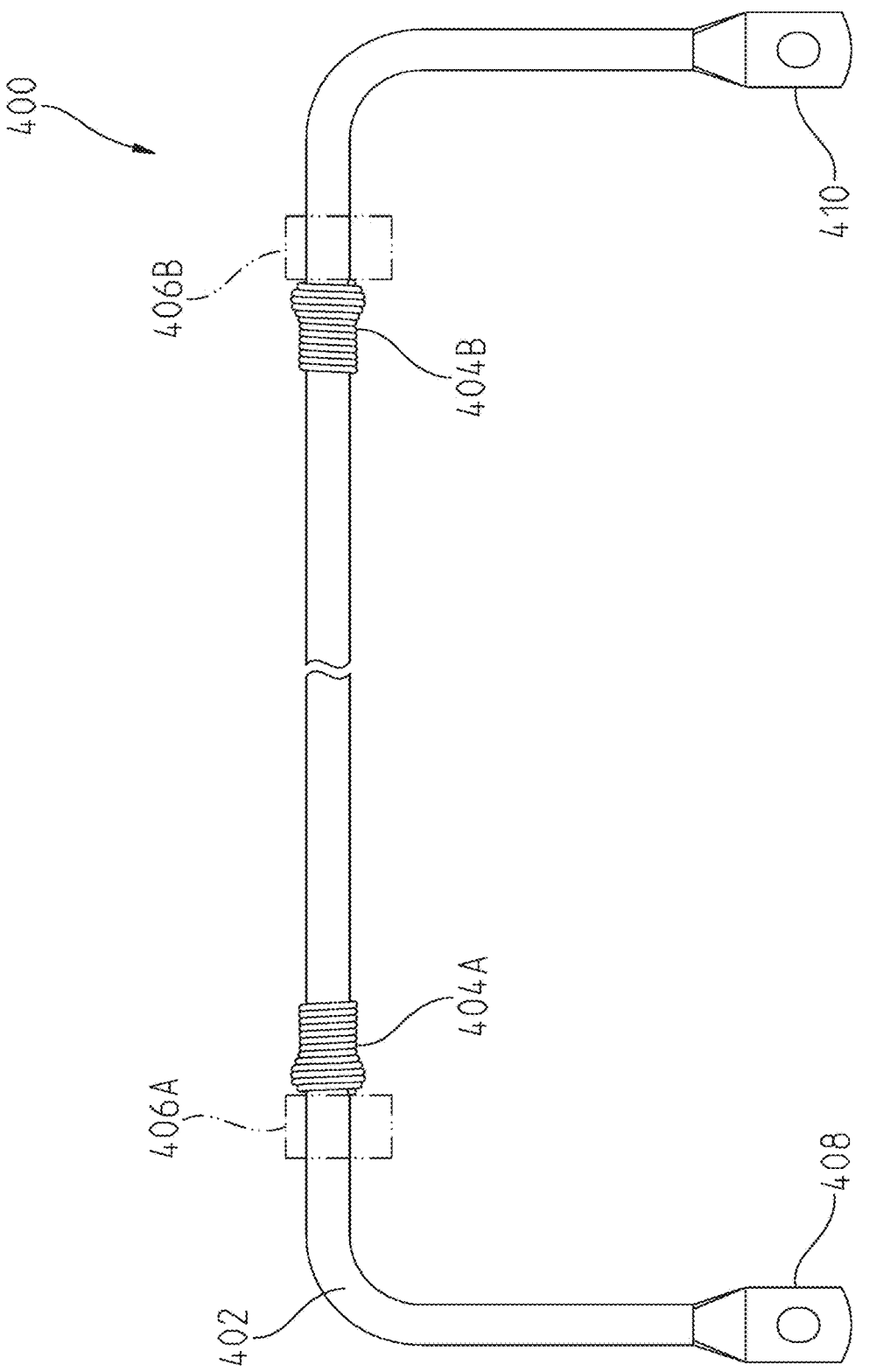
FIG. 9A illustrates a top view of an example stabilizer bar assembly that includes lateral retention features according to aspects described herein.
Figure 9B:
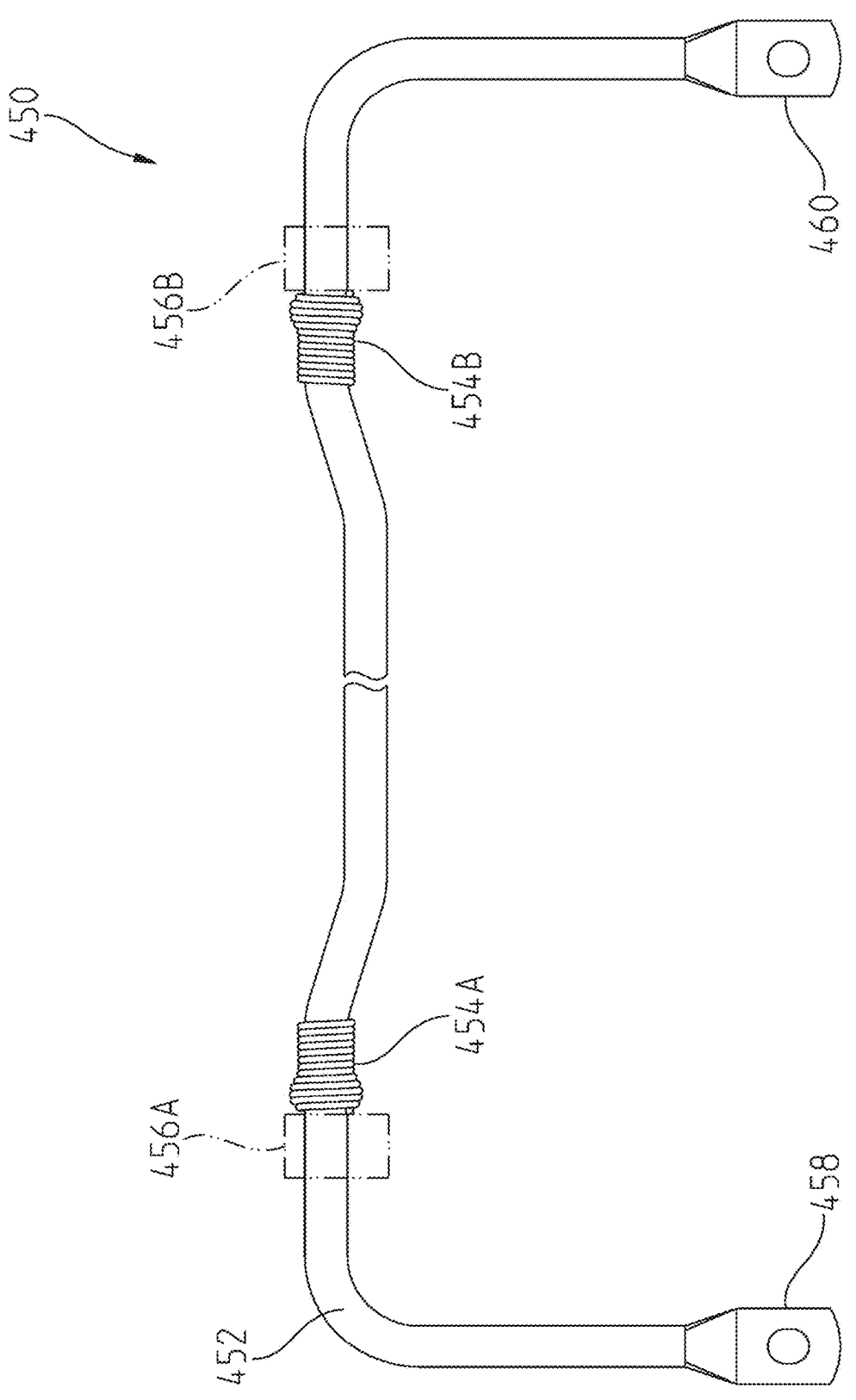
FIG. 9B illustrates a top view of another example stabilizer bar assembly that includes lateral retention features according to aspects described herein.

FIGS. 9A and 9B illustrate example stabilizer bar assemblies 400 and 450, respectively, that each include lateral retention features according to aspects described herein.

Aspects of bars 402 and 452, and lateral retention features 404A, 404B, 454A, and 454B may be similar to those discussed above with respect to FIGS. 5-8 and are therefore not redescribed in detail. Dashed boxes 406A, 406B, 456A, and 456B are provided to depict where brackets and/or bushings may be located to retain stabilizer bar 402 and 452 (e.g., thereby interfacing with lateral retention features 404A, 404B, 454A, and 454B).

As illustrated, stabilizer bar 402 includes a first end 408 and a second end 410 that are each configured to be coupled to a respective side of a suspension system (e.g., sides 204A and 204B of vehicle 100 discussed above with respect to FIGS. 5 and 6). Lateral retention features 404A and 406B are each located between ends 408 and 410, and are adjacent to region 406A and region 406B, respectively. Stabilizer bar assembly 400 depicts lateral retention features 404A and 404B in an "inboard" configuration, where they are each laterally inward from regions 406A and 406B, such that the corresponding brackets would thus be laterally external from lateral retention features 404A and 404B.

Similarly, stabilizer bar 452 includes a first end 458 and a second end 460 that are each configured to be coupled to a respective side of a suspension system. Lateral retention features 454A and 456B are each located between ends 458 and 460, and are adjacent to region 456A and region 456B, respectively. Stabilizer bar assembly 450 depicts lateral retention features 454A and 454B in an "inboard" configuration, where they are each laterally inward from regions 456A and 456B, such that the corresponding brackets would thus be laterally external from lateral retention features 454A and 454B. Stabilizer bar 452 is provided as an example stabilizer bar having a different geometry, as may be used for a vehicle having components that would intervene with a stabilizer bar that instead has a straight segment between lateral retention features (e.g., stabilizer bar 452 in FIG. 9A).

Figure 10:
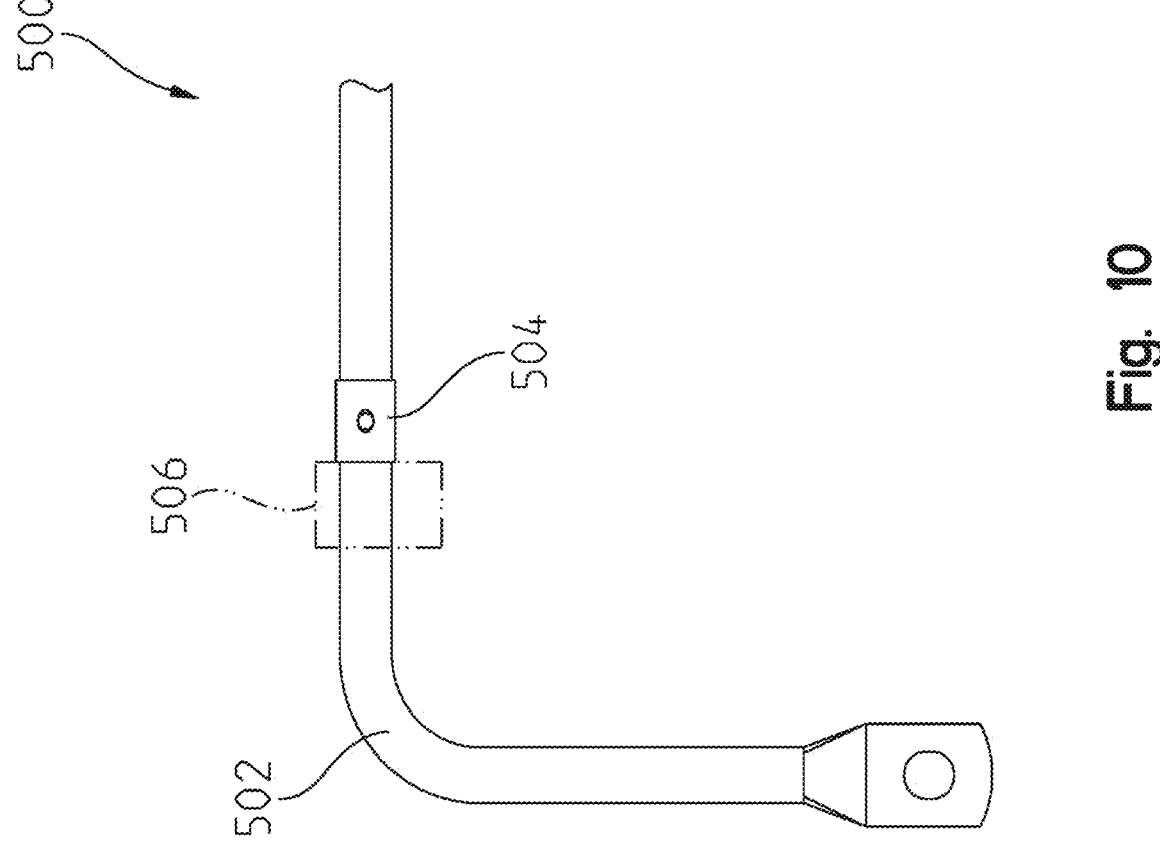
FIG. 10 illustrates another example stabilizer bar assembly that includes a lateral retention feature according to aspects described herein.

FIG. 10 illustrates another example stabilizer bar assembly 500 that includes lateral retention feature 504 according to aspects described herein. Aspects of bar 502 and dashed box 506, which corresponds to a location at which a bracket may be placed, may be similar to those discussed above with respect to FIGS. 5-8, 9A, and 9B, and are therefore not redescribed in detail.

FIG. 10 depicts another example lateral retention feature that comprises a crimped lateral retention feature rather than a coiled lateral retention feature. In examples, lateral retention feature 504 comprises a metal section through which bar 502 is disposed, after which lateral retention feature 504 is crimped, thereby affixing lateral retention feature 504 onto bar 502. As another example, lateral retention feature 504 may be comprised of two portions, such that bar 502 is arranged therebetween prior to crimping the two portions of lateral retention feature 504 together.

Thus, as compared to instances where a lateral retention feature is welded or otherwise fused to a stabilizer bar, a lateral retention feature according to aspects described herein (e.g., a coiled lateral retention feature or a crimped lateral retention feature) is mechanically coupled to a stabilizer bar in a way that has a reduced impact on the mechanical/structural properties of the stabilizer bar.

Figure 11:
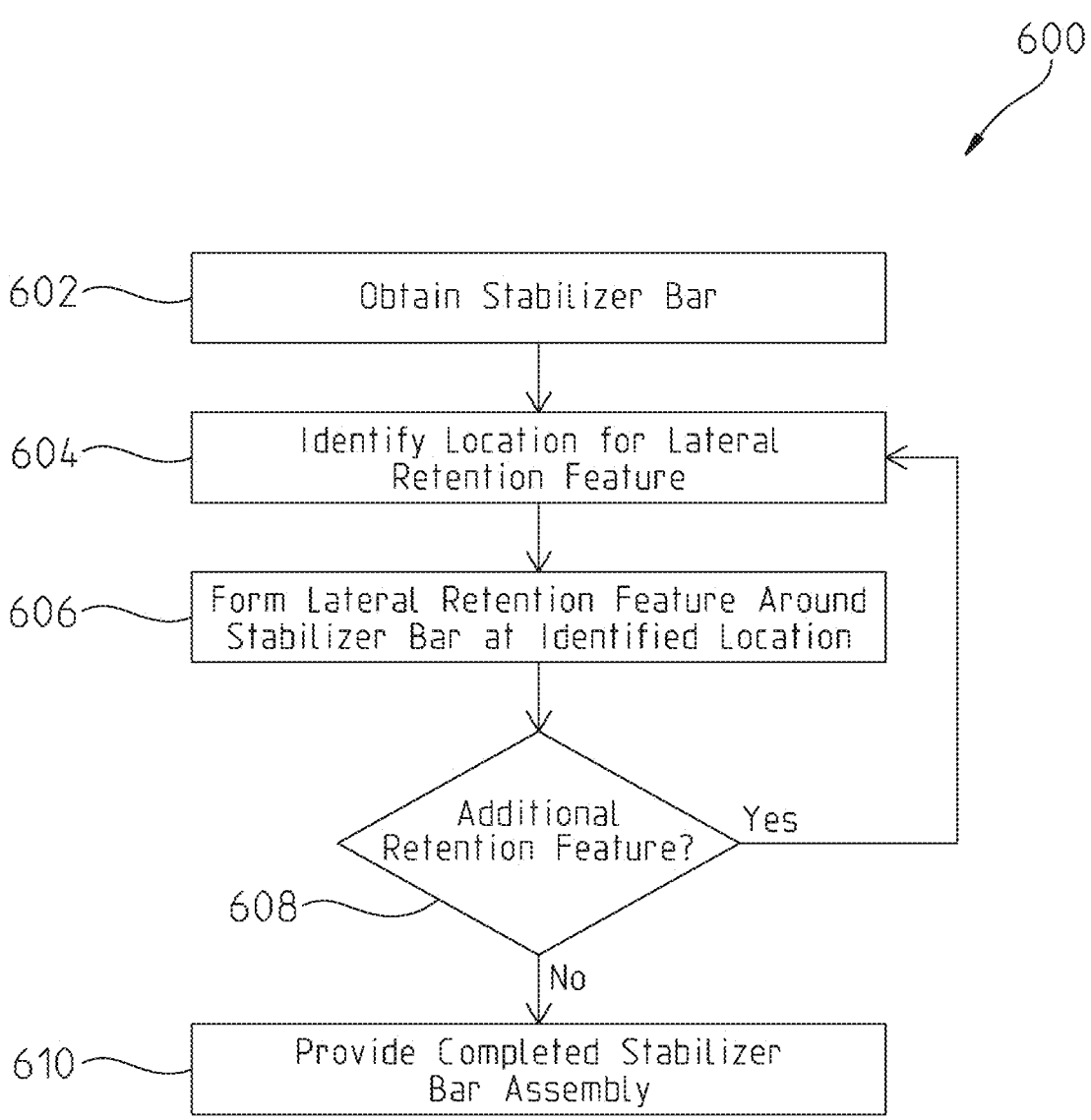
FIG. 11 illustrates an overview of an example method for manufacturing a stabilizer bar assembly that includes a lateral retention feature according to aspects described herein.

FIG. 11 illustrates an overview of an example method 600 for manufacturing a stabilizer bar assembly that includes a lateral retention feature according to aspects described herein. As illustrated, method 600 begins at operation 602, where a stabilizer bar is obtained. In examples, the stabilizer bar is sized and shaped according to a vehicle (e.g., vehicle 100 in FIGS. 1-6) for which it is being manufactured. For instance, the stabilizer bar assembly has a geometry that is determined according to vehicle components around which the stabilizer bar is positioned, as was discussed above with respect to FIGS. 9A and 9B. Additionally, or alternatively, a diameter and/or thickness of the stabilizer bar is tuned according to a desired stiffness (e.g., based on statics/kinematics of the vehicle).

At operation 604, a location is identified at which the lateral retention feature is to be formed. As noted above, a lateral retention feature may be formed on either side (or both sides) of a location at which a bracket and/or bushing is coupled to the stabilizer bar, such that the lateral retention feature is thus adjacent to the bracket. Example locations are discussed above with respect to FIGS. 5-10.

Flow progresses to operation 606, where the lateral retention feature is formed around the stabilizer bar at the identified location. In examples, operation 606 comprises forming a coil of wire around the stabilizer bar, for example using a wire forming machine. In some instances, the wire is heated as part of the wire forming process, such that the wire may shrink once it is formed around the stabilizer bar, thereby further increasing the grip of the wire on the stabilizer bar. In another example, additional heat is not used as part of the wire forming process. As noted above, the number of coils, coil profile, and/or wire profile may be tuned according to the vehicle or application in which the lateral retention feature is to be used. As another example, operation 606 comprises forming a crimped lateral retention feature around the stabilizer bar, as was discussed above with respect to FIG. 10.

At determination 608, it is determined whether an additional lateral retention feature is to be formed, such that method 600 branches "YES" and repeats operations 604 and 606 to form additional lateral retention features around the stabilizer bar accordingly. Eventually, flow branches "NO" to operation 610, where the completed stabilizer bar assembly including one or more lateral retention features is provided. As illustrated, method 600 terminates at operation 610.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A stabilizer bar assembly for a vehicle, the stabilizer bar assembly comprising:
    a stabilizer bar comprising:
        a first end configured to couple to a right side of a suspension system of the vehicle; and
        a second end configured to couple to a left side of the suspension system; and a lateral retention feature, comprising a wire coiled around the stabilizer bar to retain the wire at a location between the first end and the second end of the stabilizer bar, wherein the lateral retention feature is configured to interface with a mounting bracket of the vehicle, thereby restricting lateral movement of the stabilizer bar.

2. The stabilizer bar assembly of claim 1, wherein:
    the lateral retention feature is a first lateral retention feature;
    the location is a first location;
    the mounting bracket is a first mounting bracket;
    the stabilizer bar assembly further comprises a second lateral retention feature comprising a wire coiled around the stabilizer bar at a second location between the first location and the first end of the stabilizer bar; and
    the second lateral retention feature is configured to interface with a second mounting bracket of the vehicle.

3. The stabilizer bar assembly of claim 2, wherein:
    a region of the stabilizer bar for the first mounting bracket is laterally external to the first lateral retention feature; and
    a second region of the stabilizer bar for the second mounting bracket is laterally external to the second lateral retention feature.

4. The stabilizer bar assembly of claim 2, wherein:
    a region of the stabilizer bar for the first mounting bracket is laterally internal to the first lateral retention feature; and
    a second region of the stabilizer bar for the second mounting bracket is laterally internal to the second lateral retention feature.

5. The stabilizer bar assembly of claim 1, wherein a coil profile of the lateral retention feature includes a portion having an increased diameter as compared to another portion of the lateral retention feature.

6. The stabilizer bar assembly of claim 1, wherein a profile of the wire is substantially round.

7. A vehicle, comprising:
    a plurality of ground-engaging members;
    a suspension system supported by the plurality of ground-engaging members, wherein the suspension system includes a right side and a left side;
    a stabilizer bar having a first end coupled to the right side of the suspension system and a second end coupled to the left side of the suspension system, wherein:
        the stabilizer bar is coupled to a chassis of the vehicle by a mounting bracket; and
        the stabilizer bar comprises a lateral retention feature configured to interface with the mounting bracket, thereby restricting lateral movement of the stabilizer bar, the lateral retention feature comprising a wire coiled around the stabilizer bar to retain the wire at a location between the first end and the second end of the stabilizer bar.

8. The vehicle of claim 7, wherein:
    the lateral retention feature is a first lateral retention feature;
    the location is a first location;
    the mounting bracket is a first mounting bracket;
    the stabilizer bar assembly further comprises a second lateral retention feature comprising a wire coiled around the stabilizer bar at a second location between the first location and the first end of the stabilizer bar; and the second lateral retention feature is configured to inter-
face with a second mounting bracket of the vehicle.

9. The vehicle of claim 8, wherein:

a region of the stabilizer bar for the first mounting bracket
is laterally external to the first lateral retention feature;
and a second region of the stabilizer bar for the second
mounting bracket is laterally external to the second
lateral retention feature.

10. The vehicle of claim 8, wherein:

a region of the stabilizer bar for the first mounting bracket
is laterally internal to the first lateral retention feature;
and a second region of the stabilizer bar for the second
mounting bracket is laterally internal to the second
lateral retention feature.

11. The vehicle of claim 7, wherein a coil profile of the
lateral retention feature includes a portion having an
increased diameter as compared to another portion of the
lateral retention feature.

12. The vehicle of claim 7, wherein a profile of the wire
is substantially round.

13. The vehicle of claim 7, wherein the stabilizer bar is a
rear stabilizer bar of the vehicle.

\* \* \* \* \*